United States Patent
Li

(10) Patent No.: US 10,827,421 B2
(45) Date of Patent: Nov. 3, 2020

(54) NETWORK SLICE SELECTION METHOD, USER EQUIPMENT, AND NETWORK DEVICE

(71) Applicant: HUAWEI TECHNOLOGIES CO., LTD., Shenzhen, Guangdong (CN)

(72) Inventor: Jinze Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/529,959

(22) Filed: Aug. 2, 2019

(65) Prior Publication Data

US 2019/0357136 A1 Nov. 21, 2019

Related U.S. Application Data

(63) Continuation of application No. PCT/CN2018/077031, filed on Feb. 23, 2018.

(30) Foreign Application Priority Data

Mar. 20, 2017 (CN) .......................... 2017 1 0165728

(51) Int. Cl.
*H04W 48/18* (2009.01)
(52) U.S. Cl.
CPC .................................. *H04W 48/18* (2013.01)
(58) Field of Classification Search
CPC .................................................. H04W 48/18
USPC ..................................................... 455/435.2
See application file for complete search history.

(56) References Cited

U.S. PATENT DOCUMENTS

| | | | | |
|---|---|---|---|---|
| 10,149,193 | B2* | 12/2018 | Cui | H04W 28/0231 |
| 10,404,829 | B2* | 9/2019 | Natarajan | H04L 29/06047 |
| 2013/0007232 | A1* | 1/2013 | Wang | H04L 63/04 |
| | | | | 709/222 |
| 2013/0272216 | A1* | 10/2013 | Riggio | H04W 16/22 |
| | | | | 370/329 |
| 2016/0352924 | A1* | 12/2016 | Senarath | H04M 15/8016 |
| 2017/0054595 | A1* | 2/2017 | Zhang | H04L 41/5051 |

(Continued)

FOREIGN PATENT DOCUMENTS

| | | |
|---|---|---|
| CN | 103037469 A | 4/2013 |
| CN | 106210042 A | 12/2016 |

(Continued)

OTHER PUBLICATIONS

3GPP TR 23.799 V14.0.0, 3rd Generation Partnership Project;Technical Specification Group Services and System Aspects, Study on Architecture for Next Generation System (Release 14), Dec. 2016, 528 pages.

(Continued)

*Primary Examiner* — Mong-Thuy T Tran
(74) *Attorney, Agent, or Firm* — Fish & Richardson P.C.

(57) ABSTRACT

Embodiments of the present invention disclose a network slice selection method, user equipment (UE), and a network device. An example method includes: obtaining, by UE, slice list information of a current network from a network device; and after determining a target service request, determining, by the UE based on the target service request, a target slice from the slice list information of the current network, to connect a service corresponding to the target service request to the target slice.

14 Claims, 8 Drawing Sheets

(56) References Cited

U.S. PATENT DOCUMENTS

| | | | | |
|---|---|---|---|---|
| 2017/0086049 A1* | 3/2017 | Vrzic | ................... | H04W 4/90 |
| 2017/0141973 A1* | 5/2017 | Vrzic | ................... | H04W 24/08 |
| 2017/0318450 A1* | 11/2017 | Salkintzis | ............. | H04W 12/06 |
| 2019/0037409 A1* | 1/2019 | Wang | ................... | H04W 48/18 |
| 2019/0357131 A1* | 11/2019 | Sivavakeesar | .. | H04W 36/00835 |

FOREIGN PATENT DOCUMENTS

| | | |
|---|---|---|
| CN | 106341832 A | 1/2017 |
| CN | 106412905 A | 2/2017 |
| CN | 107295609 A | 10/2017 |
| CN | 107343306 A | 11/2017 |
| JP | 2016184853 A | 10/2016 |
| WO | 2017218849 A1 | 12/2017 |

OTHER PUBLICATIONS

3GPP TS 23.501 V0.3.1, 3rd Generation Partnership Project;Technical Specification Group Services and System Aspects, System Architecture for the 5G System, Stage 2 (Release 15), Mar. 2017, 97 pages.

3GPP TR 23.799 V1.1.0, 3rd Generation Partnership Project, Technical Specification Group Services and System Aspects, Study on Architecture for Next Generation System (Release 14), Oct. 2016, 501 pages.

3GPP TS 23.501 V1.1.0, 3rd Generation Partnership Project, Technical Specification Group Services and System Aspects, System Architecture for the 5G System, Stage 2 (Release 15), Jul. 2017, 165 pages.

3GPP TS 23.502 V0.2.0, 3rd Generation Partnership Project,Technical Specification Group Services and System Aspects, Procedures for the 5G System, Stage 2 (Release 15), Feb. 2017, 71 pages.

Office action issued in Chinese Application No. 201710165728.3 dated May 27, 2019, 7 pages.

Extended European Search Report issued in European Application No. 18771739.2 dated Aug. 12, 2019, 16 pages.

PCT International Search Report and Written Opinion issued in International Application No. PCT/CN2018/077,031, dated May 4, 2018, 19 pages (With English Translation).

Office Action issued in Korean Application No. 2019-7021133 dated Aug. 28, 2020, 10 pages (with English translation).

* cited by examiner

NETWORK SLICE SELECTION METHOD, USER EQUIPMENT, AND NETWORK DEVICE

CROSS-REFERENCE TO RELATED APPLICATIONS

This application is a continuation of International Application No. PCT/CN2018/077031, filed on Feb. 23, 2018, which claims priority to Chinese Patent Application No. 201710165728.3, filed on Mar. 20, 2017, The disclosures of the aforementioned applications are hereby incorporated by reference in their entireties.

TECHNICAL FIELD

This application relates to the communications field, and in particular, to a network slice selection method, user equipment, and a network device.

BACKGROUND

With the development of communications technologies, a concept of network slicing is introduced into a 5G network architecture. Network slicing mainly means that a plurality of independent dedicated virtual sub-networks are created in a same infrastructure to meet different service requirements. Network slicing can better support different services, including a mobile broadband, the Internet of Things, a smart grid, remote e-medical, a public safety service, and the like.

Currently, in a network slice selection method (3GPP TR 23.799) proposed in SA2, when user equipment (UE) accesses a network slice, a message carried by the UE includes assistance information such as a user identifier, a usage type (usage type) of the UE, and a service type (service type) of the UE. A slice selection function (SSF) accesses a home subscriber server (HSS) based on the user identifier, to obtain user subscription information and select, based on the usage type and the service type of the UE, a network slice suitable for the service type. Then, the SSF selects a most suitable network slice based on the user subscription information (for example, a user level). After selecting the network slice, the SSF returns information about the slice to the UE, and the UE establishes a connection to the network slice.

In the prior art, network slice selection is mainly performed on a network side, and a network slice is selected mainly based on user subscription information. Consequently, slice selection manners are relatively monotonous. As a result, UE cannot dynamically select different network slices based on different requirements, and requirements of the UE for diversified network slices cannot be met.

SUMMARY

Embodiments of the present invention provide a network slice selection method, user equipment, and a network device, so that UE can dynamically select, based on different requirements, a network slice that needs to be accessed.

According to a first aspect, an embodiment of the present invention provides a network slice selection method, and the method includes:

obtaining, by UE, slice list information of a current network from a network device; determining, by the UE, a target service request; determining, from the slice list information of the current network based on the target service request, a target slice corresponding to the target service request; and connecting a service corresponding to the target service request to the target slice.

According to this embodiment of the present invention, a suitable network slice is selected not on a network side based on user subscription information, and instead, the UE end selects, from the slice list information of the current network based on the current target service request, the target slice required by the target service request. In this way, the UE can dynamically select, based on different service requests, a network slice that needs to be accessed, and requirements of the UE for diversified network slices can be met.

In a possible implementation, a specific manner in which the UE determines, from the slice list information of the current network based on the target service request, a target slice corresponding to the target service request may be: determining, by the UE based on the target service request, a slice selection policy corresponding to the target service request; and then selecting, from the slice list information of the current network, a target slice conforming to the slice selection policy.

In this implementation, the UE end selects, from the slice list information of the current network based on the slice selection policy corresponding to the target service request, the target slice required by the target service request. In this way, the UE can dynamically select, based on different service requests, a network slice that needs to be accessed, and requirements of the UE for diversified network slices are met.

In another possible implementation, the slice list information of the current network includes a plurality of pieces of slice information, and each piece of slice information includes a service type of the slice information; and a specific manner in which the UE determines, from the slice list information of the current network based on the target service request, a target slice corresponding to the target service request may be: determining, by the UE, a target service type of the target service request; determining, from the slice list information of the current network, slice information (that is, available slice information) corresponding to the target service type; receiving, by the UE, a slice selection instruction input by a user; and determining the target slice from the available slice information based on the instruction.

In this implementation, the UE end determines, based on the target service request, the available slice information from the slice list information of the current network, and a user then selects a suitable target slice from the available slice information. Therefore, the UE can also dynamically select, based on different service requests, a network slice that needs to be accessed by a current service.

Optionally, a slice of a service type can provide a service for only a service request of this service type. Therefore, when selecting, from the slice list information of the current network, the target slice conforming to the slice selection policy, the UE may first determine the service type of the target service request; then determine, from the slice list information of the current network, the slice information (that is, the available slice information) corresponding to the target service type; and finally select, from the available slice information, the target slice conforming to the slice selection policy.

Optionally, if the slice selection policy includes at least one of a quality-of-service requirement and a charging requirement of a slice, and each piece of slice information includes at least one of a quality-of-service standard and a charging standard of the slice, the selecting, from the available slice information, the target slice conforming to the slice selection policy is actually matching a specific slice requirement in the slice selection policy with a specific slice standard provided in the slice information.

For example, a target slice whose quality-of-service standard conforms to the quality-of-service requirement in the slice selection policy may be selected from the available slice information; or a target slice whose charging standard conforms to the charging requirement in the slice selection policy may be selected from the available slice information; or a target slice whose quality-of-service standard conforms to the quality-of-service requirement in the slice selection policy and whose charging standard conforms to the charging requirement in the slice selection policy may be selected from the available slice information.

Optionally, slice selection policy information is information obtained and locally stored by the UE, and the slice selection policy information includes the slice selection policy, and may further include an identifier of a service type, an application identifier, or an identifier of an interaction object in an application.

In a specific embodiment, a manner in which the UE obtains the slice selection policy information may be that the UE obtains a slice selection policy setting input by the user.

In a specific embodiment, a manner in which the UE obtains the slice selection policy information may be that the UE determines, based on a service provided by an application, slice information required by the application, and preconfigures a slice selection policy for the application.

Optionally, when the slice selection policy information includes an identifier of a service type and the target service request includes an identifier of the target service type of the target service request, a process of the determining, by the UE based on the target service request, a slice selection policy corresponding to the target service request may be: determining, by the UE from the slice selection policy information, a slice selection policy corresponding to the identifier of the target service type.

Optionally, when the slice selection policy information includes an application identifier and the target service request includes an identifier of a target application that initiates the target service request, a process of the determining, by the UE based on the target service request, a slice selection policy corresponding to the target service request may be: determining, by the UE from the slice selection policy information, a slice selection policy corresponding to the identifier of the target application.

Optionally, when the slice selection policy information includes an identifier of the target application and an identifier of an interaction object and the target service request includes an identifier of a target application of the target service request, a process of the determining, by the UE based on the target service request, a slice selection policy corresponding to the target service request may be: determining, by the UE from the slice selection policy information, a slice selection policy corresponding to both the identifier of the target application and the identifier of the interaction object.

Optionally, the slice list information of the current network that is obtained by the UE from the network device may be sent by the network device to the UE in an attach process of the UE. A specific process may be: sending, by the UE, an attach request to the network device; and receiving, by the UE from the network device, an attach response message that responds to the attach request, where the attach response message carries the slice list information of the current network.

Optionally, a manner in which the UE determines the target service request may be: receiving, by the UE, a service selection instruction input by the user; and determining the target service request based on the service selection instruction.

According to a second aspect, an embodiment of the present invention further provides a network slice selection method, and the method includes:

obtaining, by a network device, slice list information of a current network after receiving an attach request message of UE; and generating an attach response message based on the attach request message, and sending the attach response message to the UE, where the attach response message includes the slice list information of the current network, and the slice list information of the current network is used by the UE, after the UE receives a target service request, to determine, from the slice list information of the current network based on the target service request, a target slice to be accessed by a service corresponding to the target service request.

In this embodiment of the present invention, the network device sends the slice list information of the current network to the UE, so that the UE end can dynamically select, based on different service requests, a network slice that needs to be accessed, and requirements of UE for diversified network slices can be met.

Optionally, when the network device is a slice selection function device, the sending, by the network device, the attach response message to the UE may be specifically: sending, by the slice selection function device, the attach response message to the UE via an access network device.

Optionally, when the network device is a control plane device, the sending, by the network device, the attach response message to the UE may be specifically: sending, by the control plane device, the attach response message to a slice selection function device, and sending, by the slice selection function device, the attach response message to the UE via an access network device.

Optionally, when the network device is an access network device, the sending, by the network device, the attach response message to the UE is: sending, by the access network device, the attach response message to the UE.

According to a third aspect, an embodiment of the present invention further provides user equipment that specifically implements functions corresponding to the network slice selection method provided in the first aspect. The functions may be implemented by hardware, or may be implemented by hardware executing a corresponding software program. The hardware and software include one or more units/modules corresponding to the foregoing functions. The unit/module may be hardware and/or software.

In a possible design, the user equipment includes:

an obtaining unit, configured to obtain slice list information of a current network from a network device;

a request determining unit, configured to determine a target service request;

a target slice determining unit, configured to determine, from the slice list information of the current network based on the target service request, a target slice corresponding to the target service request; and a service connection unit, configured to connect a service corresponding to the target service request to the target slice.

In a possible design, the user equipment includes:

a processor, a memory, and a transceiver, where the memory is configured to store program code, and the processor invokes the program code stored in the memory to perform the following operations:

obtaining, by using the transceiver, slice list information of a current network from a network device; determining a target service request; determining, from the slice list information of the current network based on the target service request, a target slice corresponding to the target service request; and connecting a service corresponding to the target service request to the target slice.

According to a fourth aspect, an embodiment of the present invention further provides a network device that specifically implements functions corresponding to the network slice selection method provided in the second aspect. The functions may be implemented by hardware, or may be implemented by hardware executing a corresponding software program. The hardware and software include one or more units/modules corresponding to the foregoing functions. The unit/module may be hardware and/or software.

In a possible design, the network device includes:

an obtaining unit, configured to obtain slice list information of a current network after receiving an attach request message of user equipment UE;

a generation unit, configured to generate an attach response message based on the attach request message; and a sending unit, configured to send the attach response message to the UE, where the attach response message includes the slice list information of the current network, and the slice list information of the current network is used by the UE, after the UE receives a target service request, to determine, from the slice list information of the current network based on the target service request, a target slice to be accessed by a service corresponding to the target service request.

In a possible design, the network device includes:

a processor, a memory, and a network interface, where the memory is configured to store program code, and the processor is configured to invoke the program code stored in the memory to perform the following operations:

obtaining slice list information of a current network after receiving an attach request message of UE by using the network interface; generating an attach response message based on the attach request message; and sending the attach response message to the UE, where the attach response message includes the slice list information of the current network, and the slice list information of the current network is used by the UE, after the UE receives a target service request, to determine, from the slice list information of the current network based on the target service request, a target slice to be accessed by a service corresponding to the target service request.

According to a fifth aspect, this application further provides a computer storage medium. The medium stores an application program, and when the program is executed, some or all of steps in functions corresponding to the network slice selection method provided in the first aspect are included.

According to a sixth aspect, this application further provides a computer storage medium. The medium stores an application program, and when the program is executed, some or all of steps in functions of the network slice selection method provided in the second aspect are included.

According to a seventh aspect, this application further provides a computer program product including an instruction. When the computer program product runs on a computer, the computer performs the methods described in the foregoing aspects.

From the foregoing technical solutions, it can be learned that the embodiments of the present invention have the following advantages:

In the embodiments of the present invention, the UE obtains the slice list information of the current network from the network device; and after determining the target service request, the UE determines the target slice from the slice list information of the current network based on the target service request, to connect the service corresponding to the target service request to the target slice. According to the embodiments of the present invention, the UE end that selects, from the slice list information of the current network based on the current target service request, the target slice required by the target service request. In this way, the UE can dynamically select, based on different service requests, a network slice that needs to be accessed, and requirements of the UE for diversified network slices can be met.

DESCRIPTION OF EMBODIMENTS

The following describes the embodiments of the present invention in detail with reference to the accompanying drawings.

In the 5G era, a large quantity of devices access a network, and these devices belong to different fields and have different features and requirements. Different devices have different requirements on mobility, security, latency, reliability, and even a charging manner of the network.

Currently, application scenarios of 5G include an enhanced mobile broadband (eMBB), massive Internet of Things (mMTC), and ultra-reliable and low-latency communication (URLLC).

The eMBB scenario is mainly intended for applications such as a 4K/8K ultra-high-definition video, a holographic technology, and augmented reality/virtual reality. A primary requirement of a mobile broadband is a larger data capacity. A peak rate for a smart terminal user to surf the Internet needs to reach 10 Gbit/s or even 20 Gbit/s, so as to enable high-bandwidth applications such as virtual reality, ubiquitous live broadcast and sharing of a video, and cloud access at any time and any place.

The mMTC scenario is applied to massive sensors that are deployed in fields such as measurement, architecture, agriculture, logistics, a smart city, and a home. These sensor devices are deployed extremely densely, and most are static. This requires that a 5G network support massive connections, and a quantity of human-thing connections reaches 1 million/square kilometer.

The URLLC scenario is mainly applied to fields such as unmanned driving, an automatic factory, and a smart grid and primary requirements are an ultra-low latency and high reliability. A latency as short as one millisecond is required for a 5G network, so as to enable vertical industry applications, for example, low-latency services such as smart manufacturing, remote mechanical control, assistant driving, and self-driving.

Different devices have different requirements for a network. Therefore, a concept of network slicing is introduced to a 5G network architecture. Network slicing means slicing a physical network into a plurality of virtual end-to-end networks. These virtual networks, including devices, and access, transport, and core networks in the networks, are logically independent, and a fault occurring in any one virtual network does not affect any other virtual network. The virtual networks each have different function features and are intended for different requirements and services.

Figure 1:
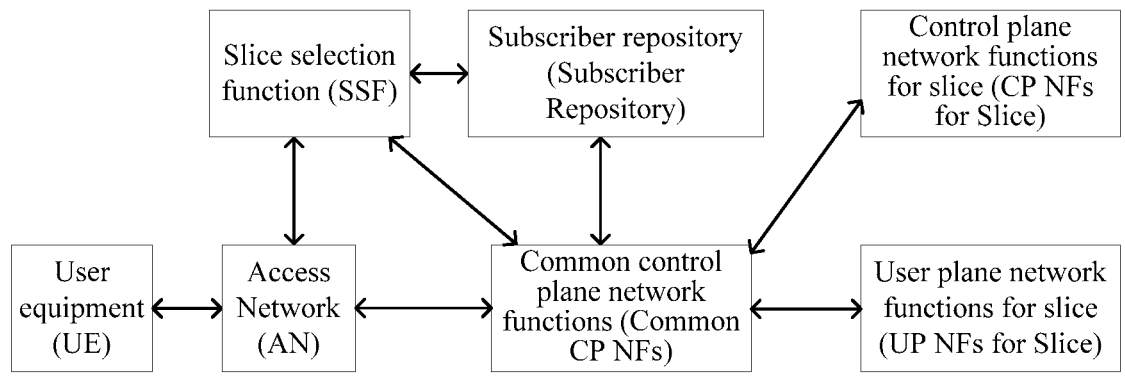
FIG. 1 is a diagram of a network slice architecture according to an embodiment of the present invention.

A diagram of a 5G network slice architecture is shown in FIG. 1, and the 5G network slice architecture includes user equipment (UE) and network elements such as an access network (AN), a slice selection function (SSF), common control plane network functions (Common CP NFs), control plane network functions for slice (CP NFs for Slice), user plane network functions for slice (UP NFs for Slice), and a subscriber repository (Subscriber Repository).

The UE may include a handheld device, an in-vehicle device, a wearable device, or a computing device that has a wireless communication function, or another processing device connected to a wireless modem, and a mobile station (Mobile station, MS for short), a terminal (terminal), a terminal device (Terminal Device), an Internet of Things device, and the like in various forms. For ease of description, these devices are briefly referred to as user equipment or UE in this application.

The AN is configured to implement radio-related functions. The AN may be a radio access network (RAN) and may be specifically a base station.

A base station in this application may be a device, in an access network, that communicates with a wireless terminal over an air interface by using one or more sectors. The base station may be a base station in a narrow sense, that is, a public mobile communications base station; or may be a base station in a broad sense, that is, a base station subsystem. For example, the base station may be a base transceiver station (BTS) in a Global System for Mobile Communications (GSM) or Code Division Multiple Access (CDMA), may be a NodeB (NodeB) in Wideband Code Division Multiple Access (WCDMA), or may be an evolved NodeB (NodeB or eNB or eNodeB, evolutional Node B) in Long Term Evolution (LTE). This is not limited in this application.

The SSF may alternatively be an SSF access management function (SSF-AMF) and is configured to select a slice.

The common control plane network function is a control plane function shared by a plurality of slices, for example, a mobility management function. The control plane network function for slice is a part that is not shared by slices, for example, a session management function.

Optionally, the common control plane network function and the control plane network function for slice may be collectively referred to as a control plane (CP) in practice. In the embodiments of the present invention, the common control plane network function and the control plane network function for slice are unified as a CP for description.

The CP is responsible for user mobility management, including functions such as mobility status management, temporary user identity allocation, and user authentication and authorization. The CP is also responsible for session management functions, including user plane (UP) network element selection, user plane network element redirection, and IP address allocation, and is responsible for functions such as establishment, modification, and release of a bearer, and quality of service (QoS) control.

The user plane network function for slice may be briefly referred to as a user plane (UP) and has functions such as user packet forwarding and encapsulation, and collection of statistics about user packets.

The subscriber repository is a core database configured to store user information.

Based on the architecture shown in FIG. 1, a network slice selection method in the embodiments of the present invention is described below with reference to FIG. 2, FIG. 3, FIG. 4, and FIG. 5.

A network device in the embodiments of the present invention may be a network device corresponding to one or more of the AN, the SSF, and the CP in the 5G network slice architecture shown in FIG. 1.

201. UE obtains slice list information of a current network from a network device.

The slice list information of the current network is a list including slice information that can be provided by a base station currently serving the UE. The slice list information of the current network including a plurality of pieces of slice information, and each piece of slice information includes slice selection assistance information (Single Network Slice Selection Assistance information, S-NSSAI) and a service type of the slice information.

The slice selection assistance information may be a slice ID (Slice Identification) or a network slice ID (Nes-ID).

The service type may also be referred to as a service type (Service Type) and is used to identify a type of a service. For example, the service type is used to indicate a service type such as an eMBB service, a URLLC service, or an mMTC service. Each service type has a corresponding service type identifier. One network slice may be corresponding to one service type, and one service type covers a plurality of network slices. Therefore, there is a mapping relationship between a service type and a network slice.

Optionally, each piece of slice information may further include information such as a quality-of-service standard of a slice and a charging standard of the slice.

The quality-of-service standard of the slice defines a level of quality of service provided by the slice, and the quality of service may include content such as a latency, reliability, bandwidth, and security. The quality-of-service standard of the slice may be flexibly set according to a requirement, for example, may be based on a high level, a medium level, or a low level, or may be set in a rating manner. This is not limited in this application.

The charging standard of the slice defines a charging level of the slice. Slice charging standards may be specifically classified by level, for example, may be classified into high, medium, and low levels, or may be classified based on a finer charging policy.

In addition, each piece of slice information may further include other information items. This is not limited herein.

The network device may obtain the slice list information of the current network from a slice management system in a core network. For example, the slice management system delivers the slice list information of the network to network elements on a network side, including network elements such as an AN, an SSF, and a CP, and the network elements store the slice list information of the current network.

That UE obtains slice list information of a current network from a network device may be specifically as follows: The UE obtains the slice list information of the current network from the network device in a UE attach process or in a process in which the UE establishes a session. A specific manner is not limited in this embodiment of the present invention.

For example, the UE may send an attach request to the network device. The network device generates an attach response message based on the attach request message of the UE, adds the slice list information of the current network to the attach response message, and sends the attach response message to the UE. The UE receives the attach response message from the network device and obtains the slice list information of the current network from the attach response message.

Optionally, the UE stores the obtained slice list information of the current network. When the slice list information of the current network in the network device is updated (when slice information is added, deleted, or modified), the network device may provide updated slice information for the UE for synchronization, so that the UE can update the locally stored slice list information.

202. The UE determines a target service request.

The target service request may be a service request determined by the UE based on a service selection instruction after a user selects a target service on the UE and the UE receives the service selection instruction input by the user. For example, when the user plays a live video in a video application (APP) installed on the UE, the UE receives a video service selection instruction input by the user, and determines a video service request based on the instruction.

203. The UE determines, from the slice list information of the current network based on the target service request, a target slice corresponding to the target service request.

Specifically, that the UE may determine, in a plurality of implementations from the slice list information of the current network based on the target service request, a target slice corresponding to the target service request.

1. The target slice is selected based on a slice selection policy.

In this implementation, the UE first determines, based on the target service request, a slice selection policy corresponding to the target service request, and then selects, from the slice list information of the current network obtained in step 201, a target slice conforming to the slice selection policy.

The slice selection policy includes information such as a quality-of-service requirement and a charging requirement of a slice. The quality-of-service requirement is used to define quality of service required by a currently requested service, and the charging requirement is used to define a charging requirement corresponding to the currently requested service.

During setting of the slice selection policy, a level of the slice selection policy may be flexibly set, for example, may be set based on a high level, a medium level, and a low level, or set in a rating manner. This is not limited herein.

Optionally, the UE obtains and stores slice selection policy information, and each piece of slice selection policy information includes a slice selection policy.

The UE obtains the slice selection policy information in the following manners:

(1) The user sets the slice selection policy information on the UE.

In this manner, the user may set a slice selection policy for a service type on the UE; or the user may set a slice selection policy for an application on the UE.

A video application on the UE is used as an example. The user may configure, in the video application, parameters such as video quality, a bandwidth rate, and a latency, so that the UE generates a slice selection policy based on the parameters configured by the user.

(2) The UE preconfigures the slice selection policy information for an application.

Depending on a service provided by an application, the UE determines, based on a configuration parameter commonly used for the service, slice information required by the application, and preconfigures a slice selection policy for the application.

The slice selection policy may be set based on different granularities, and examples are as follows.

(1) The slice selection policy may be set based on a service type granularity, and one slice selection policy is set for each service type on the UE.

For example, a same slice selection policy A is set for all eMBB services, a same slice selection policy B is set for all URLLC services, and a same slice selection policy C is set for all mMTC services.

When the slice selection policy is set based on the service type granularity, the slice selection policy information includes an identifier of a service type and a slice selection policy corresponding to the service types.

(2) The slice selection policy may be set based on an application granularity, and one slice selection policy is set for each type of application or each application on the UE.

For example, on the UE, a same slice selection policy is set for all video-type applications, or one slice selection policy is set for each video application.

When the slice selection policy is set based on the application granularity, the slice selection policy information includes an application identifier (APP ID) and a slice selection policy corresponding to the application identifier.

(3) In an application, slice selection policies may be set for different interaction objects based on the different interaction objects.

For example, for a social application, friends in a contact list of the social application are classified into a plurality of levels based on intimacy levels of the friends in the contact list, and one slice selection policy is set for each level, to distinguish network service levels of communication between the user and friends of different intimacy levels. Therefore, for example, a slice with high quality of service can be used for a video call with a friend of a high intimacy level.

When the slice selection policy is set based on an interaction object granularity, the slice selection policy information includes an identifier of an interaction object and a slice selection policy corresponding to the identifier of the interaction object.

Based on different granularities for setting the slice selection policy in the slice selection policy information, specific manners for the UE to determine the slice selection policy corresponding to the target service request may include the following ones:

(1) When the target service request includes an identifier of a target service type of the target service request, and the slice selection policy in the slice selection policy information obtained by the UE is set based on the service type granularity, the UE determines, from the slice selection policy information, a slice selection policy corresponding to the identifier of the target service type.

(2) When the target service request includes an identifier of a target application that initiates the target service request, and the slice selection policy in the slice selection policy information obtained by the UE is set based on the application granularity, the UE determines, from the slice selection policy information, a slice selection policy corresponding to the identifier of the target application.

(3) When the target service request includes an identifier of a target application that initiates the target service request and an identifier of an interaction object, and the slice selection policy in the slice selection policy information obtained by the UE is set based on the interaction object granularity, the UE determines, from the slice selection policy information, a slice selection policy corresponding to both the identifier of the target application and the identifier of the interaction object.

After the UE determines the slice selection policy corresponding to the target service request, a specific manner for selecting, from the slice list information of the current network obtained in step 201, the target slice conforming to the slice selection policy is as follows:

The UE first determines a service type of the target service request, determines, from the slice list information of the current network, slice information (available slice information) corresponding to the target service type, and then selects, from the available slice information, the target slice conforming to the slice selection policy.

A specific manner for selecting, from the available slice information, the target slice conforming to the slice selection policy is matching information such as a quality-of-service requirement and a charging requirement that are in the slice selection policy with a quality-of-service standard and a charging standard that are of each piece of slice information in the available slice information, to find the target slice suitable for the slice selection policy.

Specifically, a target slice whose quality-of-service standard conforms to the quality-of-service requirement in the slice selection policy is selected from the available slice information; or a target slice whose charging standard conforms to the charging requirement in the slice selection policy is selected from the available slice information; or a target slice whose quality-of-service standard conforms to the quality-of-service requirement in the slice selection policy and whose charging standard conforms to the charging requirement in the slice selection policy is selected from the available slice information.

For example, it is assumed that a slice selection policy configured for an application is that a slice whose quality of service is high and whose charging is "medium" needs to be preferentially selected. In this case, first, slices in the available slice information are sorted based on quality of service to select slices whose quality of service is high; then, the selected slices are sorted based on charging standards to select slices whose charging standards are "medium"; and finally, a suitable slice is selected, and a slice identifier corresponding to the slice is obtained.

2. The target slice is determined based on a slice selection instruction input by the user.

In another optional implementation, the UE first determines a target service type of the target service request, and then determines, from the slice list information of the current network, slice information (that is, available slice information) corresponding to the target service type. The UE presents the available slice information to the user, to help the user make a selection. After receiving the slice selection instruction input by the user, the UE determines, from the available slice information based on the slice selection instruction, a target slice selected by the user.

204. The UE connects a service corresponding to the target service request to the target slice.

After determining the target slice corresponding to the target service request, the UE connects the service corresponding to the target service request to the target slice, to provide the corresponding service by using the target slice.

In this embodiment of the present invention, the UE obtains the slice list information of the current network from the network device, and determines, based on the service requested by the UE, the target slice from the slice list information of the current network, to connect the service requested by the UE to the target slice. Therefore, in this embodiment of the present invention, the UE end selects, from the slice list information of the current network based on the current service request, the target slice required by the service request. In this way, the UE can dynamically select, based on different service requests, a network slice that needs to be accessed, and requirements of the UE for diversified network slices are met.

Figure 3:
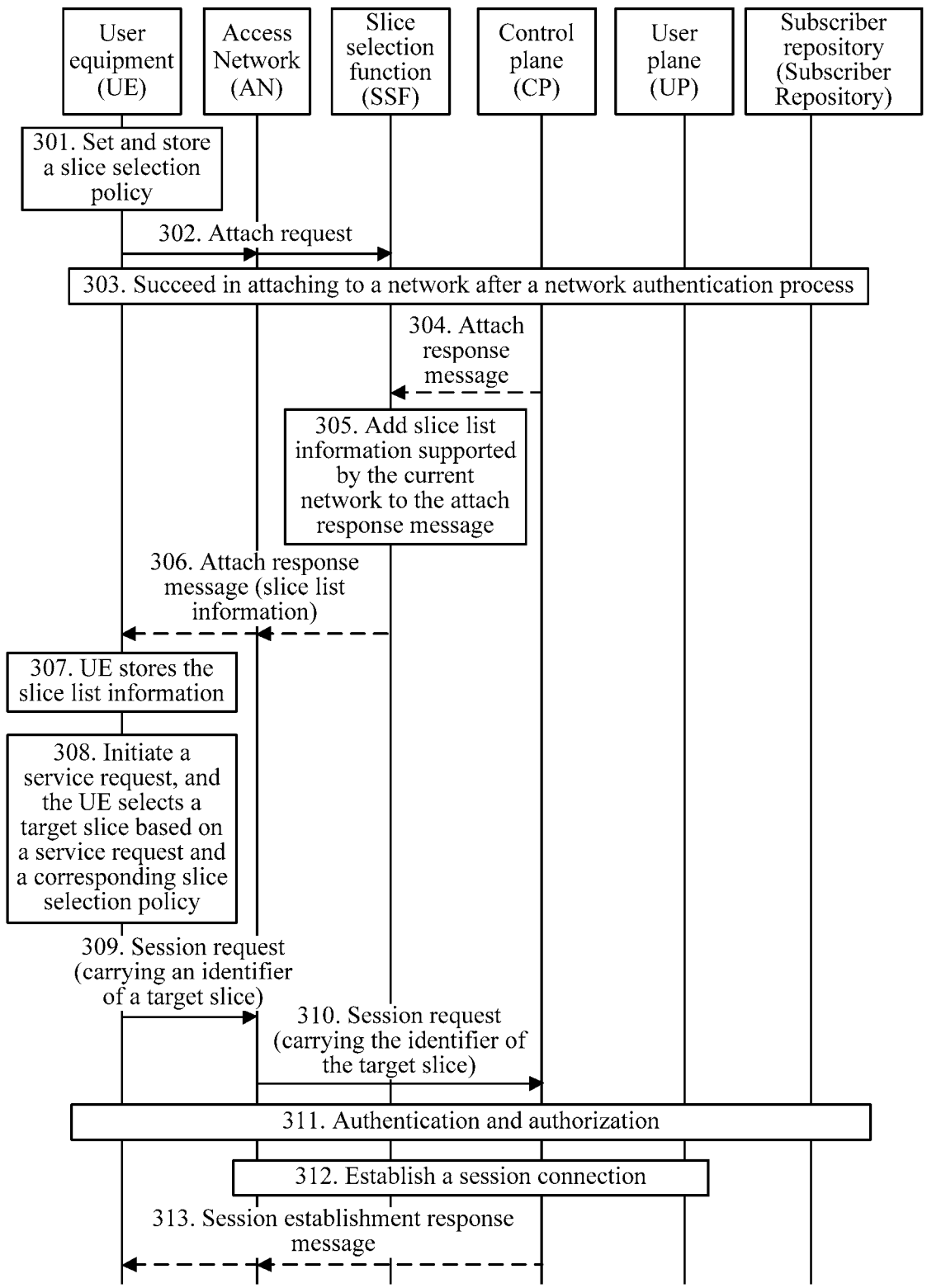
FIG. 3 is an information exchange flowchart of a network slice selection method according to an embodiment of the present invention.

With reference to FIG. 3, a process of selecting a target slice based on a slice selection policy by UE is described below in detail. In an embodiment of the present invention, a scenario in which an application granularity is used as a granularity for setting the slice selection policy and a service request is initiated by an application is used for description.

301. UE sets a slice selection policy and stores the slice selection policy.

When setting a slice selection policy for an application based on an application granularity, the UE may enable a user to set the slice selection policy when the user starts the application for the first time, or enable a user to set the slice selection policy when the user selects a specific service in the application, or the UE sets the slice selection policy for the application based on slice information commonly used for a service provided by the application.

The slice selection policy includes a specific requirement of the application for a network, and may include information such as a quality-of-service requirement and a charging requirement of a slice.

The application sends the specified slice selection policy and an application identifier (APP ID) to the UE, and the UE stores the application identifier and the slice selection policy corresponding to the application identifier.

302. The UE sends an attach request to a core network.

The UE sends the attach request (initial attach) to the AN. The attach request carries information such as a UE identifier (UE ID), a usage type (Usage Type) of the UE, and a service type of the UE. Then, the AN forwards the attach request to an SSF.

The usage type of the UE is a terminal type of the UE and is used to uniquely determine a type identifier of a terminal device used by the user. For example, a terminal device applicable to mMTC, such as a sensor, can perform only an mMTC service. For example, the usage type of the UE indicates an access capability of a terminal device in a network standard. For example, a mobile device in an LTE network can perform only an LTE network service, or a mobile device in a 5G network can perform only a 5G network service. Therefore, there is a mapping relationship between the usage type and the service type of the UE: One usage type may be corresponding to a plurality of service types. To be specific, one UE may support services of a plurality of service types, but the usage type of the UE limits service types supported by the UE to some extent.

303. An SSF accesses a subscriber repository, searches for subscription data of the UE based on a UE identifier, and determines whether the UE is allowed to access a network; and network elements on the network side perform network authentication on the UE, and the UE succeeds in attaching to the network.

304. After the UE succeeds in attaching to the network, a CP sends an attach response message to the SSF.

305. The SSF adds slice list information supported by the current network to the attach response message.

306. The SSF sends, to the AN, the attach response message that carries the slice list information supported by the current network, and the AN then sends the attach response message to the UE.

307. The UE stores the slice list information supported by the current network that is carried in the received attach response message.

308. An application initiates a service request requesting access to a corresponding slice, where an initiated service is corresponding to a service type. The application sends an application identifier (APP ID) and a service type of the slice required by the service to the UE. The UE matches the obtained service type with the slice list information stored by the UE, to obtain a filtered slice information list (available slice information). Afterwards, the UE obtains, based on the obtained APP ID, a slice selection policy configured in step 301 for this application, and then selects a corresponding slice, that is, a target slice, from the filtered available slice information based on the obtained slice selection policy, to obtain slice selection assistance information (S-NSSAI) of the target slice, where the slice selection assistance information may be a slice ID (Nes-ID).

In a specific implementation, a slice selection process may be that the UE sorts and performs matching for the available slice information step by step based on the slice selection policy corresponding to the application. For example, it is assumed that the slice selection policy for the application is that a slice whose quality-of-service standard is high and whose charging standard is "medium" needs to be preferentially selected. In this case, first, the available slice information is sorted based on quality of service to select slices whose quality of service is high; then, the selected slices are sorted based on charging standards to select slices whose charging standards are "medium"; and finally, a suitable slice is selected, and a slice identifier corresponding to the slice is obtained.

309. After obtaining a slice identifier (Nes-ID) of the slice, the UE sends a session request to the AN, where the session request carries the Nes-ID of the slice.

310. The AN sends the session request to the CP of the slice based on content of the Nes-ID.

311. The CP performs authentication and authorization operations for the slice.

312. The CP performs session management processing and establishes a connection to a UP.

313. The CP returns a session establishment response message to the UE, and the UE may subsequently provide the service for the application by using the slice.

In this embodiment of the present invention, the UE obtains the slice list information of the current network from the SSF. The UE obtains, based on the service request initiated by the application, the slice selection policy corresponding to the application, and selects the suitable slice from the slice list information of the current network based on the slice selection policy, to connect the service requested by the application to the slice. In this embodiment of the present invention, the UE end selects, from the slice list information of the current network based on the slice selection policy, the target slice required by the service request. In this way, the UE can dynamically select, based on different service requests, a network slice that needs to be accessed, and requirements of the UE for diversified network slices are met.

Optionally, based on the embodiment shown in FIG. 3, after step 303, the SSF may select a default network slice for the UE based on the usage type of the UE, the service type of the UE, and subscription data of the UE. The SSF adds information about the selected default network slice to the attach request, and sends the attach request to the CP. The CP performs an authorization operation for the default network slice and establishes a UP connection of the slice, and then the CP performs step 304 to send an attach response message to the SSF. After receiving the attach response request, the SSF performs steps 305 to 313.

In the embodiment shown in FIG. 3, the SSF adds the slice list information supported by the current network to the attach response message and returns the attach response message to the UE. In actual application, the slice list information may alternatively be added to the attach response message by the CP or the AN.

Figure 4:
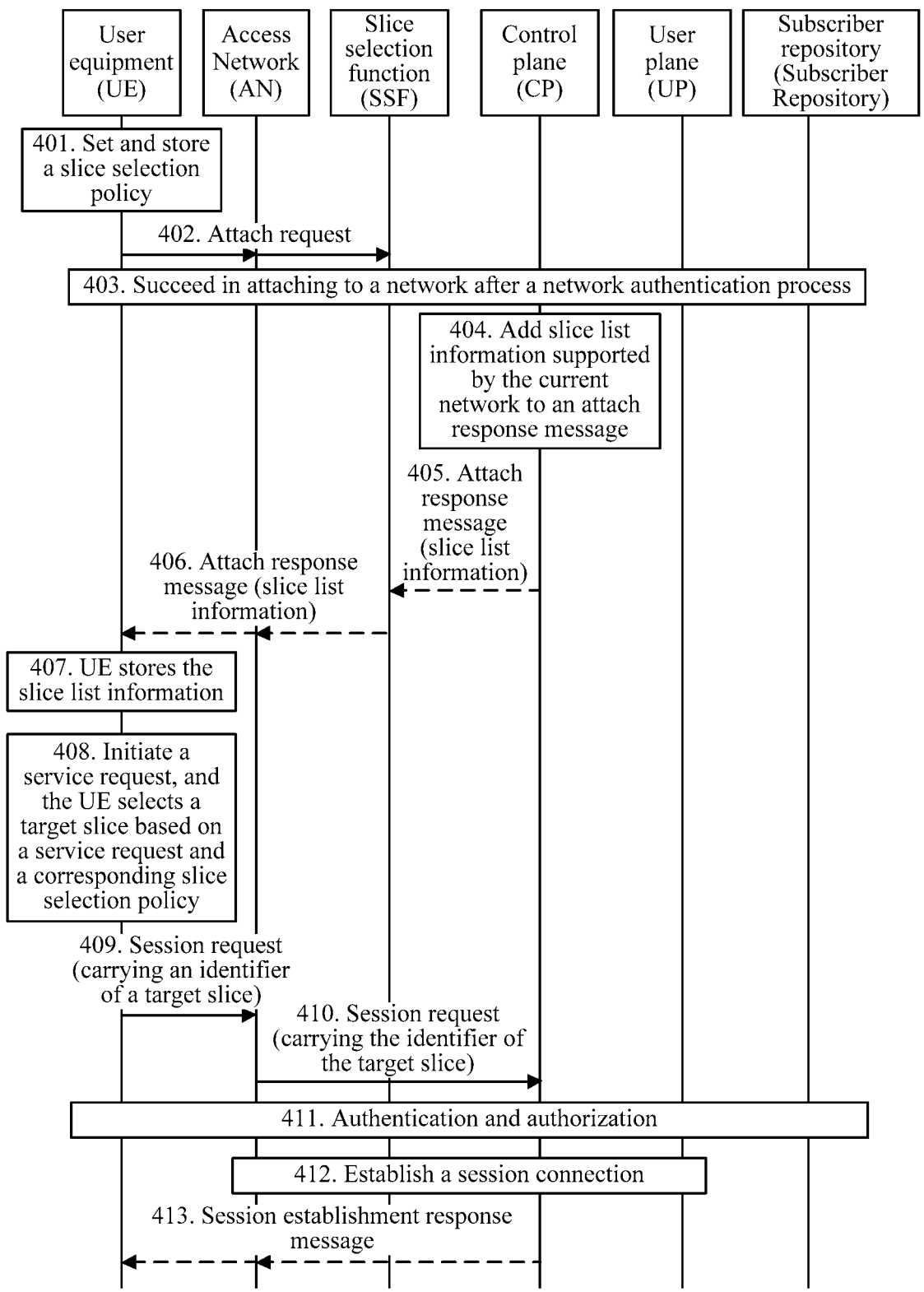
FIG. 4 is another information exchange flowchart of a network slice selection method according to an embodiment of the present invention.

As shown in FIG. 4, in a specific implementation, the CP adds the slice list information to the attach response message.

Steps 401 to 403 are the same as steps 301 to 303 in the embodiment shown in FIG. 3, and details are not described herein again.

404. A CP adds slice list information supported by the current network to an attach response message.

405. The CP sends, to the SSF, the attach response message that carries the slice list information of the current network.

406. The SSF sends, to the UE via the AN, the attach response message that carries the slice list information of the current network.

Steps 407 to 413 are the same as steps 307 to 313 in the embodiment shown in FIG. 3, and details are not described herein again.

Figure 5:
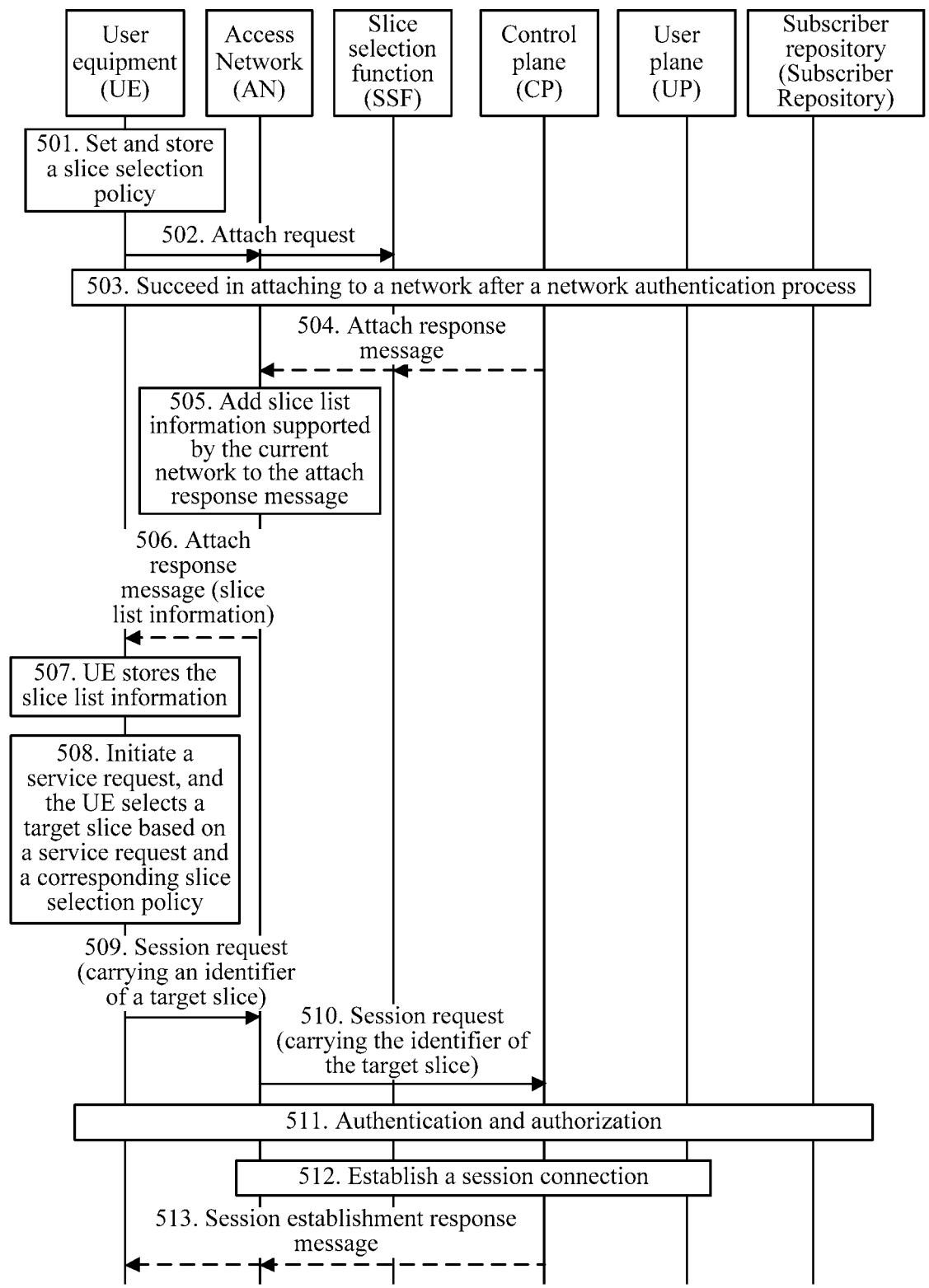
FIG. 5 is another information exchange flowchart of a network slice selection method according to an embodiment of the present invention.

As shown in FIG. 5, in another specific implementation, the AN adds the slice list information to the attach response message.

Steps 501 to 503 are the same as steps 301 to 303 in the embodiment shown in FIG. 3, and details are not described herein again.

504. A CP sends an attach response message to the SSF, and the SSF sends the attach response message to the AN.

505. The AN adds slice list information supported by the current network to the attach response message.

506. The AN sends, to the UE, the attach response message that carries the slice list information of the current network.

Steps 507 to 513 are the same as steps 307 to 313 in the embodiment shown in FIG. 3, and details are not described herein again.

In this embodiment of the present invention, each network element on the network side, including the CP, the SSF, or the AN, that can obtain the slice list information of the current network may add the slice list information supported by the current network to the attach response message, to send the slice list information to the UE, so that the UE side can select the suitable slice from the slice list information supported by the current network. In this way, the UE can dynamically select, based on different service requests, a network slice that needs to be accessed, and requirements of the UE for diversified network slices are met.

The network slice selection method in the embodiments of the present invention is described above, and user equipment and a network device in the embodiments of the present invention are described from perspectives of function modules and hardware implementation.

Figure 6:
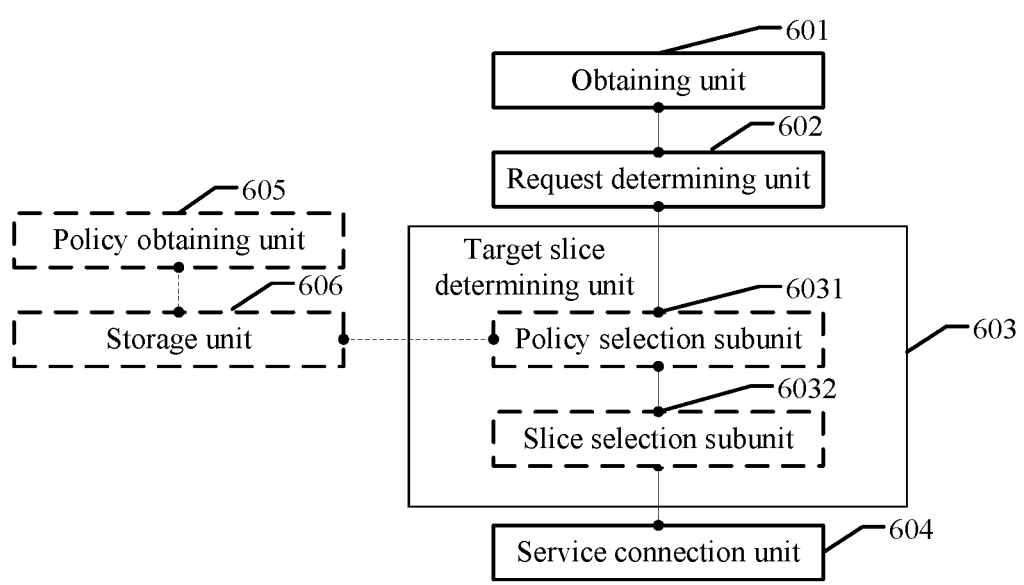
FIG. 6 is a schematic diagram of a function module structure of user equipment according to an embodiment of the present invention.

FIG. 6 is a schematic diagram of a function module structure of user equipment according to an embodiment of the present invention, and the user equipment includes the following function units:

an obtaining unit 601, configured to obtain slice list information of a current network from a network device;

a request determining unit 602, configured to determine a target service request;

a target slice determining unit 603, configured to determine, from the slice list information of the current network based on the target service request, a target slice corresponding to the target service request; and a service connection unit 604, configured to connect a service corresponding to the target service request to the target slice.

In some specific embodiments, the target slice determining unit 603 includes:

a policy selection subunit 6031, configured to determine, based on the target service request, a slice selection policy corresponding to the target service request; and a slice selection subunit 6032, configured to select, from the slice list information of the current network, a target slice conforming to the slice selection policy.

In some specific embodiments:

the slice list information of the current network that is obtained by the obtaining unit 601 includes a plurality of pieces of slice information, and each piece of slice information includes a service type of the slice information; and the slice selection subunit 6032 is specifically configured to: determine a service type of the target service request; determine available slice information from the slice list information of the current network, where the available slice information includes slice information corresponding to a target service type; and select, from the available slice information, the target slice conforming to the slice selection policy.

In some specific embodiments:

the slice selection policy determined by the policy selection subunit 6031 includes at least one of a quality-of-service requirement and a charging requirement of a slice; and in the slice list information of the current network that is obtained by the obtaining unit 601, each piece of slice information includes at least one of a quality-of-service standard and a charging standard of the slice; and the slice selection subunit 6032 is specifically configured to select, from the available slice information, a target slice whose quality-of-service standard conforms to the quality-of-service requirement in the slice selection policy; or the slice selection subunit 6032 is specifically configured to select, from the available slice information, a target slice whose charging standard conforms to the charging requirement in the slice selection policy; or the slice selection subunit 6032 is specifically configured to select, from the available slice information, a target slice whose quality-of-service standard conforms to the quality-of-service requirement in the slice selection policy and whose charging standard conforms to the charging requirement in the slice selection policy.

In some specific embodiments, the user equipment further includes:

a policy obtaining unit 605, configured to obtain slice selection policy information; and a storage unit 606, configured to store the slice selection policy information, where the slice selection policy information includes the slice selection policy.

Optionally, the slice selection policy information includes an identifier of a service type. When the target service request includes an identifier of a target service type of the target service request, the policy selection subunit 6031 is specifically configured to determine, from the slice selection policy information obtained by the policy obtaining unit 605, a slice selection policy corresponding to the identifier of the target service type.

Optionally, the slice selection policy information includes an application identifier. When the target service request includes an identifier of a target application that initiates the target service request, the policy selection subunit 6031 is specifically configured to determine, from the slice selection policy information obtained by the policy obtaining unit 605, a slice selection policy corresponding to the identifier of the target application.

In some specific embodiments, the obtaining unit 601 is specifically configured to: send an attach request to the network device; and receive, from the network device, an attach response message that responds to the attach request, where the attach response message includes the slice list information of the current network.

In some specific embodiments, the request determining unit 602 is specifically configured to: receive a service selection instruction input by a user, and determine the target service request based on the service selection instruction.

Figure 2:
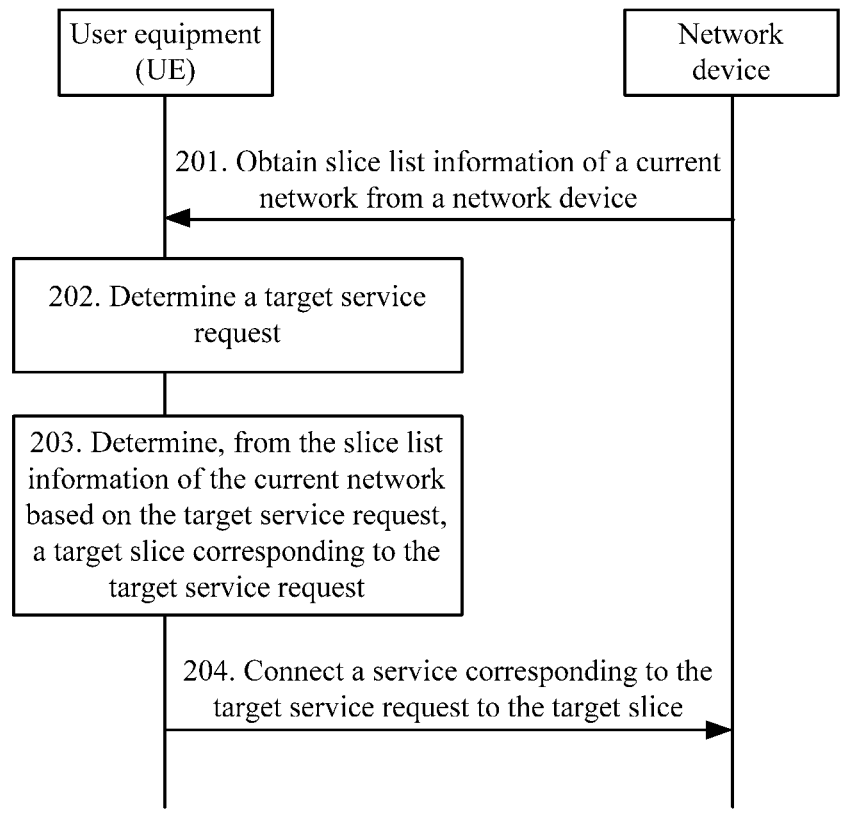
FIG. 2 is a flowchart of a network slice selection method according to an embodiment of the present invention.

For information exchange between the units in the user equipment shown in FIG. 6, refer to the descriptions in the solution in which the UE selects the target slice based on the slice selection policy in the embodiment shown in FIG. 2 and the descriptions in the embodiments shown in FIG. 3 to FIG. 5 in the foregoing method embodiments. Details are not described again in this application.

Figure 7:
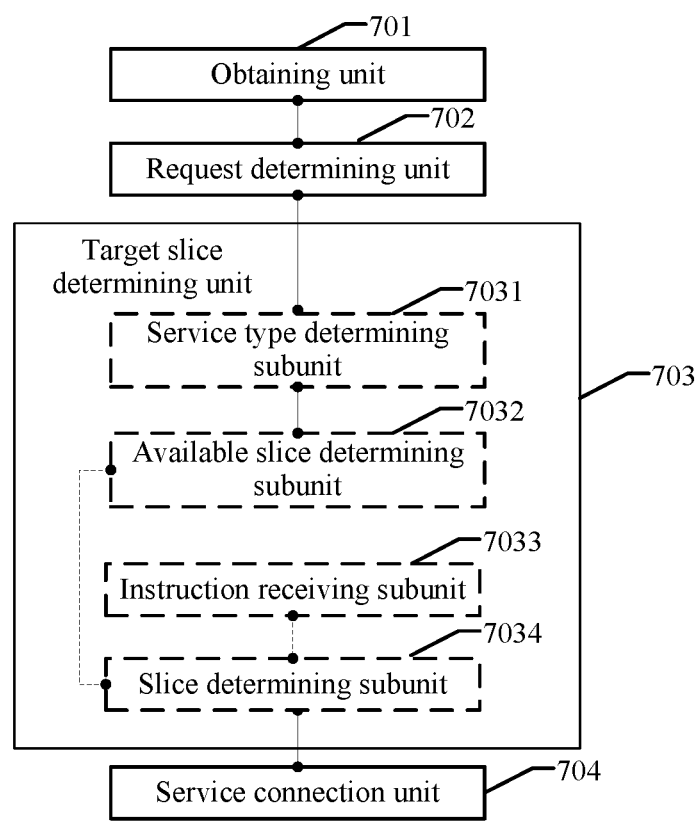
FIG. 7 is a schematic diagram of another function module structure of user equipment according to an embodiment of the present invention.

FIG. 7 is a schematic diagram of another function module structure of user equipment according to an embodiment of the present invention, and the user equipment includes the following function units:

an obtaining unit 701, configured to obtain slice list information of a current network from a network device;

a request determining unit 702, configured to determine a target service request;

a target slice determining unit 703, configured to determine, from the slice list information of the current network based on the target service request, a target slice corresponding to the target service request; and a service connection unit 704, configured to connect a service corresponding to the target service request to the target slice.

In some specific embodiments, the slice list information of the current network that is obtained by the obtaining unit 701 includes a plurality of pieces of slice information, and each piece of slice information includes a service type of the slice information; and the target slice determining unit 703 includes:

a service type determining subunit 7031, configured to determine a target service type of the target service request;

an available slice determining subunit 7032, configured to determine available slice information from the slice list information of the current network, where the available slice information includes slice information corresponding to the target service type;

an instruction receiving subunit 7033, configured to receive a slice selection instruction input by a user, where the slice selection instruction is used for selecting the target slice from the available slice information; and a slice determining subunit 7034, configured to determine the target slice from the available slice information based on the slice selection instruction.

For information exchange between the units in the user equipment shown in FIG. 7, refer to the descriptions in the solution in which the UE selects the target slice based on the slice selection instruction input by the user in the embodiment shown in FIG. 2 in the foregoing method embodiments. Details are not described again in this application.

In actual application, as described above, the UE may include a handheld device, an in-vehicle device, a wearable device, or a computing device that has a wireless communication function, or another processing device connected to a wireless modem, and a mobile station, a terminal, terminal device, or an Internet of Things device that is in various forms. For example, the UE may be a virtual reality device applied to an eMBB scenario, a sensor-equipped Internet of Things device applied to an mMTC scenario, or a terminal device applied to a URLLC scenario.

Figure 8:
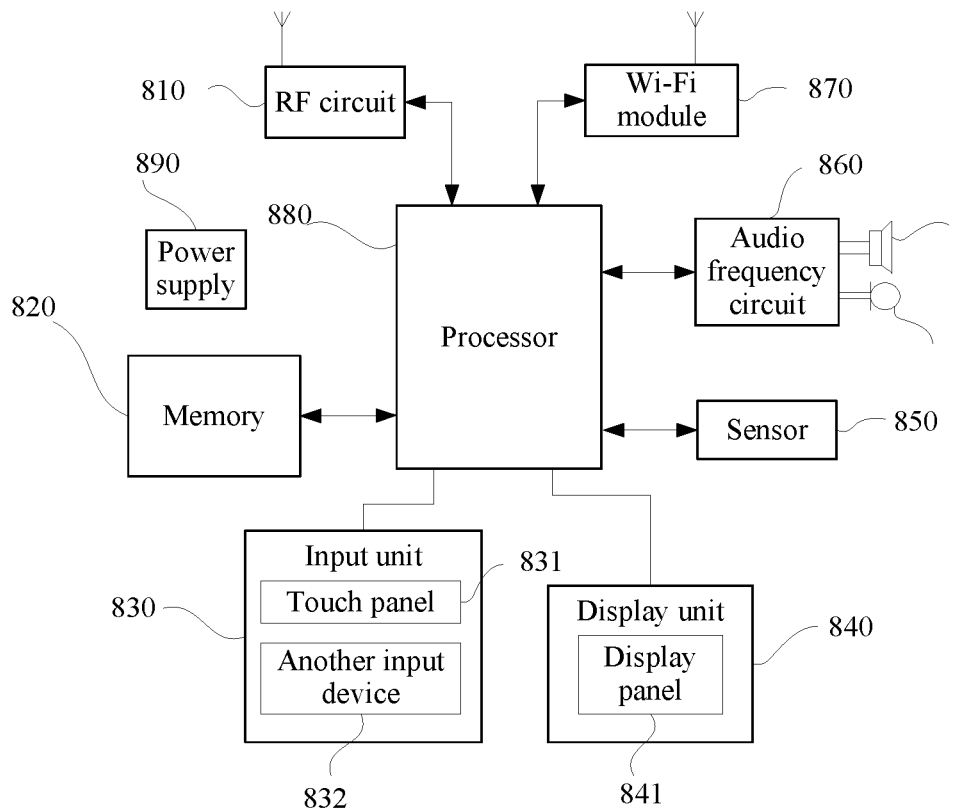
FIG. 8 is a schematic diagram of a hardware structure of user equipment according to an embodiment of the present invention.

FIG. 8 is a block diagram of a partial structure of user equipment according to an embodiment of the present invention. In actual application, a hardware structure of the user equipment varies with an application scenario, and therefore different configurations or performance causes a relatively large difference.

Referring to FIG. 8, the user equipment includes components such as a radio frequency (RF) circuit 810, a memory 820, an input unit 830, a display unit 840, a sensor 850, an audio frequency circuit 860, a Wireless Fidelity (Wi-Fi) module 870, a processor 880, and a power supply 890. Persons skilled in the art may understand that the structure shown in FIG. 8 does not constitute any limitation on the user equipment. The user equipment may include more or fewer components than those shown in the figure, or some components may be combined. When being applied to different fields, the components shown in FIG. 8 may be totally omitted according to a requirement without changing the scope of the essence of the present invention if the components are not mandatory constituents of the user equipment.

The components of the user equipment are specifically described with reference to FIG. 8.

The RF circuit 810 may be configured to: receive and send a signal in an information receiving/sending process or a call process. Particularly, after receiving downlink information of a base station, the RF circuit 810 sends the downlink information to the processor 880 for processing, and sends uplink data to the base station.

The memory 820 may be configured to store a computer software program, data, or an operating system. The processor 880 runs the computer software program stored in the memory 820, to perform various function applications of the user equipment and data processing. The memory 820 may mainly include a program storage area and a data storage area. The program storage area may store an operating system, an application program required by at least one function, and the like. The data storage area may store data created based on use of the user equipment, and the like. In addition, the memory 820 may include a high-speed random access memory, or may further include a nonvolatile memory, for example, at least one magnetic disk storage component, a flash memory component, or another volatile solid-state storage component.

The input unit 830 may be configured to receive digit or character information that is input. Specifically, the input unit 830 may include a touch Plane 831 and another input device 832. The touch Plane 831, also referred to as a touchscreen, may collect a touch operation performed by a user on or near the touch Plane 831, and drive a corresponding connection apparatus according to a preset program.

The display unit 840 may be configured to display information entered by the user or information provided for the user. The display unit 840 may include a display Plane 841. Optionally, the touch Plane 831 and the display Plane 841 may be integrated to implement input and output functions of the user equipment.

The user equipment may further include a sensor 850, for example, an optical sensor, a motion sensor, and another Internet of Things sensor.

The processor 880 is a control center of the user equipment, and is connected to all parts of the user equipment by using various interfaces and lines. The processor 880 runs or executes the computer software program and/or module stored in the memory 820 and invokes data stored in the memory 820, to perform various functions of the user equipment and data processing. Specifically, in this embodiment of the present invention, the processor 880 invokes the software program in the memory 820, to perform the steps performed by the UE in the embodiments shown in FIG. 2 to FIG. 5.

The network device in the embodiments of the present invention is described below.

Figure 9:
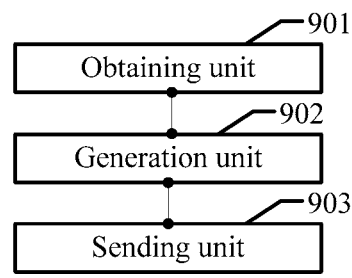
FIG. 9 is a schematic diagram of a function module structure of a network device according to an embodiment of the present invention.

FIG. 9 is a schematic diagram of a function module structure of a network device according to an embodiment of the present invention, and the network device includes the following function units:

an obtaining unit 901, configured to obtain slice list information of a current network after receiving an attach request message of user equipment UE;

a generation unit 902, configured to generate an attach response message based on the attach request message; and a sending unit 903, configured to send the attach response message to the UE, where the attach response message includes the slice list information of the current network, and the slice list information of the current network is used by the UE, after the UE receives a target service request, to determine, from the slice list information of the current network based on the target service request, a target slice to be accessed by a service corresponding to the target service request.

In actual application, the network device may be a network device corresponding to one or more network elements in the AN, the SSF, and the CP in the network slice architecture shown in FIG. 1, or a function module corresponding to one or more network elements in the AN, the SSF, and the CP.

In some specific embodiments, when the network device is a slice selection function device, the sending unit 903 is specifically configured to send the attach response message to the UE via an access network device.

In some specific embodiments, when the network device is a control plane device, the sending unit 903 is specifically configured to send the attach response message to a slice selection function device, where the attach response message is sent to the UE by the slice selection function device via an access network device.

In some specific embodiments, when the network device is an access network device, the sending unit 903 is specifically configured to send the attach response message to the UE.

For information exchange between the units in the network device shown in FIG. 9, refer to the descriptions in the embodiments shown in FIG. 2 to FIG. 5 in the foregoing method embodiments. Details are not described again in this application.

Figure 10:
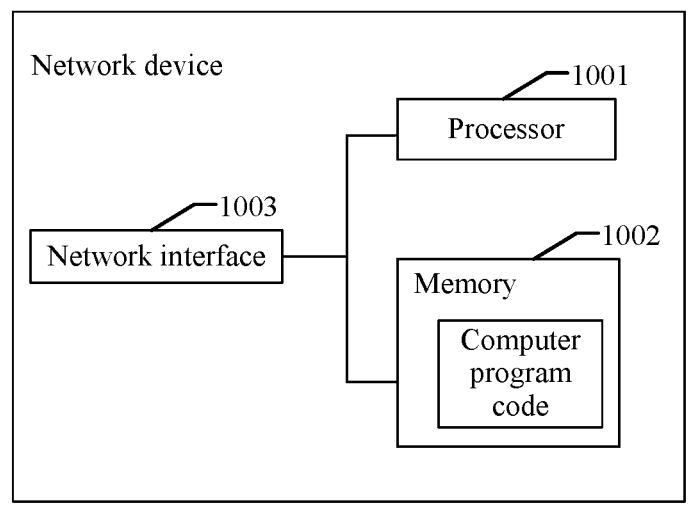
FIG. 10 is a schematic diagram of a hardware structure of a network device according to an embodiment of the present invention.

In actual application, different configurations or performance causes a relatively large difference in the hardware structure of the network device. As shown in FIG. 10, a network device may include one or more processors 1001, at least one memory 1002, and at least one network interface 1003. The memory 1002 is configured to store one or more operating systems, and store computer program code and data. The computer program code stored in the memory 1002 may include one or more modules (which are not marked in the figure), and each module may include a series of instruction operations applied to a control plane device. The processor 1001 communicates with the memory 1002 and the network interface 1003. The control plane device communicates with other devices in a core network and a base station by using the network interface 1003. The processor 1001 runs, on the control plane device, the series of instruction operations in the memory 1002, to perform all or some of the steps performed by the network device in the foregoing method embodiments (the embodiments shown in FIG. 2 to FIG. 5).

Persons skilled in the art may understand that the structure shown in FIG. 10 constitute no limitation on the network device. The network device may include more or fewer components than those shown in the figure, or some components may be combined. For example, when the network device is an access network device (for example, a base station), the network device further includes a receiver and a transmitter.

In addition, this application further provides a computer storage medium. The medium stores an application program, and when the program runs, some or all of the steps in the foregoing network slice selection methods (the embodiments shown in FIG. 2 to FIG. 5) are included.

It should be noted that all or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on a computer, the processes or functions according to the embodiments of the present invention are all or partially generated. The computer may be a general-purpose computer, a special-purpose computer, a computer network, or other programmable apparatuses. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or may be integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate. Parts displayed as units may or may not be physical units, may be located in one position, or may be distributed on a plurality of network units. Some or all of the units may be selected depending on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing embodiments are merely intended to describe the technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A network slice selection method, comprising:
   obtaining, by a user equipment (UE), slice list information of a current network from a network device;
   determining a target service request, wherein the target service request comprises an identifier of a target service type of the target service request;
   determining, by the UE, from the slice list information of the current network based on the target service request, a target slice corresponding to the target service request, wherein the determining, from the slice list information of the current network based on the target service request, the target slice corresponding to the target service request comprises:
      obtaining slice selection policy information, wherein the slice selection policy information comprises an identifier of a service type;
      determining a slice selection policy corresponding to the target service request based on the identifier of the service type in the slice selection policy information matching the identifier of the target service type in the target service request, wherein the slice selection policy comprises at least one of a quality-of-service requirement or a charging requirement of a slice; and
      selecting, from the slice list information of the current network, the target slice conforming to the slice selection policy; and
   connecting a service corresponding to the target service request to the target slice.

2. The method according to claim 1, wherein
   the slice list information of the current network comprises a plurality of pieces of slice information, and each piece of slice information comprises a service type of the slice information; and
   the selecting from the slice list information of the current network, a target slice conforming to the slice selection policy comprises:
      determining a target service type of the target service request;
      determining available slice information from the slice list information of the current network, wherein the available slice information comprises slice information corresponding to the target service type; and
      selecting, from the available slice information, the target slice conforming to the slice selection policy.

3. The method according to claim 2, wherein
   each piece of slice information comprises at least one of a quality-of-service standard or a charging standard of the slice; and
   the selecting, from the available slice information, the target slice conforming to the slice selection policy comprises:
      selecting, from the available slice information, a target slice whose quality-of-service standard conforms to the quality-of-service requirement in the slice selection policy; or
      selecting, from the available slice information, a target slice whose charging standard conforms to the charging requirement in the slice selection policy.

4. The method according to claim 1, wherein the method further comprises:
   storing the slice selection policy information, wherein the slice selection policy information comprises the slice selection policy.

5. The method according to claim 1, wherein the obtaining, slice list information of a current network from a network device comprises:
   sending an attach request to the network device; and
   receiving from the network device, an attach response message that responds to the attach request, wherein the attach response message comprises the slice list information of the current network.

6. A communication device, comprising: at least one processor; and a computer readable medium in communication with the at least one processor, the computer readable medium storing computer readable instructions stored thereon that, when executed by the at least one processor, cause the communication device to:
   obtain slice list information of a current network from a network device;
   determine a target service request, wherein the target service request comprises an identifier of a target service type of the target service request;
   determine, from the slice list information of the current network based on the target service request, a target slice corresponding to the target service request, wherein the determining, from the slice list information of the current network based on the target service request, the target slice corresponding to the target service request comprises:
      obtaining slice selection policy information, wherein the slice selection policy information comprises an identifier of a service type;
      determining a slice selection policy corresponding to the target service request based on the identifier of the service type in the slice selection policy information matching the identifier of the target service type in the target service request, wherein the slice selection policy comprises at least one of a quality-of-service requirement or a charging requirement of a slice; and
      selecting, from the slice list information of the current network, the target slice conforming to the slice selection policy; and
   connect a service corresponding to the target service request to the target slice.

7. The communication device according to claim 6, wherein
   the slice list information of the current network comprises a plurality of pieces of slice information, and each piece of slice information comprises a service type of the slice information; and
   wherein the computer readable instructions when further executed by the at least one processor, cause the communication device to:
      determine a target service type of the target service request;
      determine available slice information from the slice list information of the current network, wherein the available slice information comprises slice information corresponding to the target service type; and
      select, from the available slice information, the target slice conforming to the slice selection policy.

8. The communication device according to claim 7, wherein;

each piece of slice information comprises at least one of a quality-of-service standard or a charging standard of the slice; and wherein the computer readable instructions when further executed by the at least one processor, cause the communication device to:
- select, from the available slice information, a target slice whose quality-of-service standard conforms to the quality-of-service requirement in the slice selection policy; or
- select, from the available slice information, a target slice whose charging standard conforms to the charging requirement in the slice selection policy.

9. The communication device according to claim 8, wherein the computer readable instructions when further executed by the at least one processor, cause the communication device to:
- store the slice selection policy information, wherein the slice selection policy information comprises the slice selection policy.

10. The communication device according to claim 9, wherein
- the slice selection policy information comprises an application identifier;
- the target service request comprises an identifier of a target application that initiates the target service request; and
- wherein the computer readable instructions when further executed by the at least one processor, cause the communication device to:
  - determine, from the slice selection policy information, a slice selection policy corresponding to the identifier of the target application.

11. The communication device according to claim 6, wherein the computer readable instructions when further executed by the at least one processor, cause the communication device to:
- send an attach request to the network device; and
- receive, from the network device, an attach response message that responds to the attach request, wherein the attach response message comprises the slice list information of the current network.

12. A network slice selection system, comprising a user equipment (UE), and a network device,
- wherein the network device is configured to send slice list information of a current network to the UE; and
- wherein the UE is configured to
  - obtain the slice list information;
  - determine a target service request, wherein the target service request comprises an identifier of a target service type of the target service request;
  - determine from the slice list information based on the target request, a target slice corresponding to the target service request, wherein the determining, from the slice list information of the current network based on the target service request, the target slice corresponding to the target service request comprises:
    - obtaining slice selection policy information, wherein the slice selection policy information comprises an identifier of a service type;
    - determining a slice selection policy corresponding to the target service request based on the identifier of the service type in the slice selection policy information matching the identifier of the target service type in the target service request, wherein the slice selection policy comprises at least one of a quality-of-service requirement or a charging requirement of a slice; and
    - selecting, from the slice list information of the current network, the target slice conforming to the slice selection policy; and
  - connect a service corresponding to the target service request to the target slice.

13. The system according to claim 12, wherein the UE is further configured to:
- store the slice selection policy information, wherein the slice selection policy information comprises the slice selection policy.

14. The system according to claim 12, wherein the network device is configured to:
- obtain the slice list information after receiving an attach request message of the UE;
- generate an attach response message based on the attach request message; and
- send the attach response message to the UE, wherein the attach response message comprises the slice list information, and the slice list information is used for determining, from the slice list information of the current network based on the target service request, a target slice to be accessed by a service corresponding to the target service request received by the UE.

* * * * *